(12) United States Patent
Shin et al.

(10) Patent No.: US 10,447,743 B2
(45) Date of Patent: Oct. 15, 2019

(54) APPARATUS, METHOD AND NON-TRANSITORY COMPUTER-READABLE RECORDING MEDIUM FOR PROVIDING CONTENT SHARING SERVICE

(71) Applicant: LINE Corporation, Shinjuku-ku, Tokyo (JP)

(72) Inventors: Ick Hyun Shin, Tokyo (JP); Su Min Jo, Tokyo (JP)

(73) Assignee: LINE CORPORATION, Tokyo (JP)

( * ) Notice: Subject to any disclaimer, the term of this patent is extended or adjusted under 35 U.S.C. 154(b) by 164 days.

(21) Appl. No.: 15/236,982

(22) Filed: Aug. 15, 2016

(65) Prior Publication Data
US 2017/0054771 A1    Feb. 23, 2017

(30) Foreign Application Priority Data
Aug. 19, 2015   (KR) .......................... 10-2015-0116759

(51) Int. Cl.
*H04L 29/06* (2006.01)
*G06F 17/30* (2006.01)
(Continued)

(52) U.S. Cl.
CPC ............ *H04L 65/403* (2013.01); *G06F 16/22* (2019.01); *G06F 16/2379* (2019.01); *G06F 16/9535* (2019.01); *H04L 67/306* (2013.01)

(58) Field of Classification Search
CPC ..... H04L 65/403; H04L 67/306; H04L 67/10; G06F 17/30377; G06F 17/30867; G06F 17/30312
See application file for complete search history.

(56) References Cited

U.S. PATENT DOCUMENTS 6,859,807 B1 *  2/2005  Knight .................. G06Q 10/10
8,874,559 B1 * 10/2014  Karimzadehgan .......................... G06F 17/30516
                                                             707/707
(Continued)

FOREIGN PATENT DOCUMENTS

| JP | 2013-539568 A | 10/2013 |
| KR | 10-2011-0000686 | 1/2011 |
| WO | WO-2009146087 A1 | 12/2009 |

OTHER PUBLICATIONS

Korean Office Action dated May 11, 2016 for Application No. KR 10-2015-0116759.

*Primary Examiner* — Nicholas R Taylor
*Assistant Examiner* — Sanjoy K Roy
(74) *Attorney, Agent, or Firm* — Harness, Dickey & Pierce, P.L.C.

(57) ABSTRACT

A method of providing a content sharing service, the method includes receiving, from a first user, a content registration request including first content; generating identification (ID) information of the first content; storing the first content and ID information in a content storage unit; generating an index update command for updating an index of each of other users having a first relationship with the first user by using the ID information of the first content; adding the ID information of the first content to the indices of each of the other users, based on the index update command, wherein each of the indices of the other users is stored in an index storage unit; reading content stored in the content storage unit based on ID information of content included in an index of the second user; and providing a news feed including the first content to the second user.

11 Claims, 3 Drawing Sheets

(51) Int. Cl.
  *H04L 29/08* (2006.01)
  *G06F 16/22* (2019.01)
  *G06F 16/23* (2019.01)
  *G06F 16/9535* (2019.01)

(56) References Cited

U.S. PATENT DOCUMENTS

| | | | |
|---|---|---|---|
| 9,177,346 B2 | 11/2015 | Ahrens et al. | |
| 2012/0005224 A1* | 1/2012 | Ahrens | H04W 4/21 |
| | | | 707/769 |
| 2012/0110085 A1* | 5/2012 | Malik | G06Q 10/00 |
| | | | 709/205 |
| 2013/0091217 A1* | 4/2013 | Schneider | G06Q 50/01 |
| | | | 709/204 |
| 2013/0238706 A1* | 9/2013 | Desai | H04L 67/306 |
| | | | 709/204 |
| 2015/0213144 A1* | 7/2015 | Voigt | H04L 51/32 |
| | | | 707/722 |
| 2015/0347482 A1* | 12/2015 | Bati | G06F 17/30336 |
| | | | 707/742 |

* cited by examiner

APPARATUS, METHOD AND NON-TRANSITORY COMPUTER-READABLE RECORDING MEDIUM FOR PROVIDING CONTENT SHARING SERVICE

CROSS-REFERENCE TO RELATED APPLICATION

This application claims priority under 35 U.S.C. § 119 to Korean Patent Application No. 10-2015-0116759 filed on Aug. 19, 2015, in the Korean Intellectual Property Office, the entire contents of which are incorporated herein by reference.

BACKGROUND

1. Field

One or more embodiments relate to a method, apparatus, and computer-readable recording medium for providing a content sharing service.

2. Description of the Related Art

This section provides background information related to the present disclosure which is not necessarily prior art.

With the recent increase in supply and accessibility of communication networks, such as the Internet, an amount of requests to share content between users is rapidly increasing and services providing interfaces for sharing content between users are being actively developed and deployed. Much of the content shared is shared based on relationships between users.

SUMMARY

This section provides a general summary of the disclosure, and is not a comprehensive disclosure of its full scope or all of its features.

According to at least some example embodiments, a method of providing a content sharing service includes receiving, from a first user, a content registration request including first content; generating identification (ID) information of the first content; storing the first content and the ID information of the first content in a content storage unit; generating an index update command for updating an index of each of other users having a first relationship with the first user by using the ID information of the first content; processing the index update command by adding the ID information of the first content to the indices of each of the other users, based on the index update command, wherein each of the indices of the other users is stored in an index storage unit; receiving a news feed provision request from a second user; reading content stored in the content storage unit based on ID information of content included in an index of the second user; and providing a news feed including the first content to the second user.

The method may further include storing the index update command in a queue after the generating of the index update command, wherein the processing of the index update command includes processing the index update command in accordance with an order in which the index update command was stored in the queue.

The index update command may include ID information of the first user and the ID information of the first content, or include ID information of each of subscribers having the first relationship with the first user and the ID information of the first content.

The method may further include adding the ID information of the content to an index of the first user after the generating ID information of the first content and the storing the first content and the ID information of the first content, the index of the first user being stored in the index storage unit.

The other users may have the first relationship with the first user are users subscribed to a channel including content uploaded by the first user.

The method may further include matching a plurality of pieces of content and a plurality of pieces of ID information in a one-to-one manner; and storing the matched plurality of pieces of content and plurality of pieces of ID information in the content storage unit in the one-to-one manner, the reading content stored in the content storage unit including, reading, from the content storage unit, content matching the ID information of the first content, the ID information of the first content being included in the index of the second user.

The method may further include storing indices of each of users subscribed to the content sharing service, respectively, in the index storage unit, ID information of content registered by other users being listed in the indices of users from among the users subscribed to the content sharing service.

For a first index stored in the index storage unit, ID information stored in the first index may be listed in an order corresponding to an order in which content which the ID information stored in the first index identifies was registered.

The news feed may be a screen in which first content is listed in an order, with respect to other content, that corresponds to an order, with respect to ID information of the other content, in which the ID information of the first content is stored in the index of the second user.

According to at least some example embodiments, a non-transitory computer-readable recording medium stores computer-executable instructions that, when executed by a processor, cause the processor to perform operations including receiving, from a first user, a content registration request including first content; generating identification (ID) information of the first content; storing the first content and the ID information of the first content in a content storage unit; generating an index update command for updating an index of each of other users having a first relationship with the first user by using the ID information of the first content; processing the index update command by adding the ID information of the first content to the indices of each of the other users, based on the index update command, wherein each of the indices of the other users is stored in an index storage unit; receiving a news feed provision request from a second user; reading content stored in the content storage unit based on ID information of content included in an index of the second user; and providing a news feed including the first content to the second user.

According to at least some example embodiments, an apparatus for providing a content sharing service includes memory storing computer-executable instructions; and one or more processors configured to execute the instructions such that the one or more processors are configured to receive, from a first user, a content registration request including first content, generate identification (ID) information of the first content, store the first content and the ID information of the first content in a content storage unit, generate an index update command for updating an index of each of other users having a first relationship with the first user by using the ID information of the first content, add the ID information of the first content to the indices of each of the other users, based on the index update command, wherein each of the indices of the other users is stored in an index storage unit, receiving a news feed provision request from a second user, read content stored in the content storage unit based on ID information of content included in an index of the second user, and provide a news feed including the first content to the second user.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Figure 1:
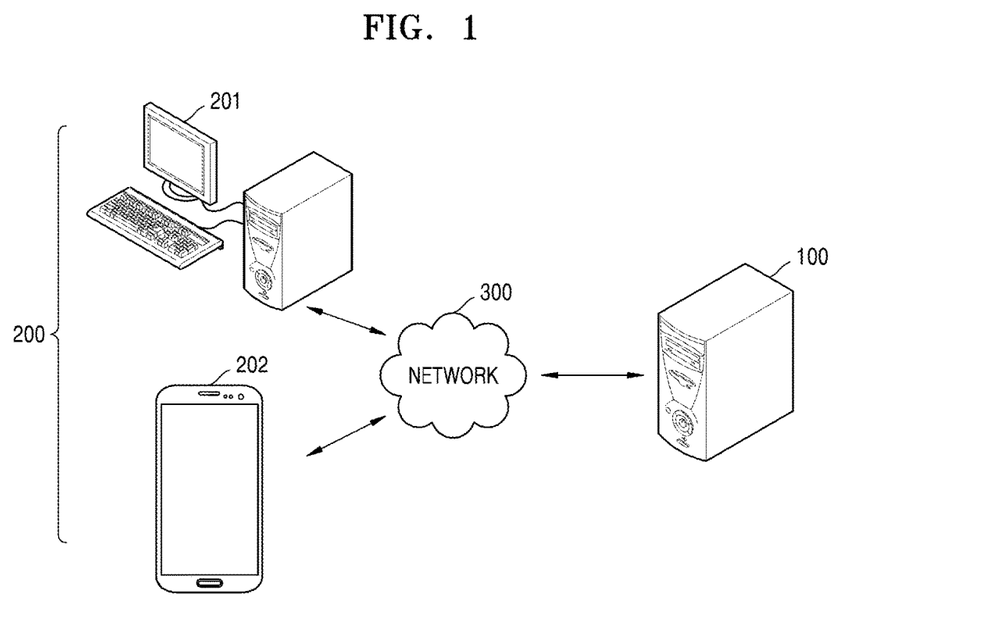
FIG. 1 is a diagram of a structure of a content sharing system according to an example embodiment.

FIG. 1 is a diagram of a structure of a content sharing system according to an example embodiment.

Referring to FIG. 1, the content sharing system according to an example embodiment includes a server 100, user terminals 200, and a network 300 connecting the server 100 and the user terminals 200.

The content sharing system according to an example embodiment provides a content sharing service. For example, the content sharing system according to an example embodiment provides a content sharing service in which a user uploads content, shares the uploaded content with other users, looks up and subscribes to a channel including content uploaded by another user, and looks up popular content. The content sharing system according to an example embodiment registers content in the server 100 when a user uploads the content, and provides an interface for other users to look up and subscribe to a channel including the content registered in the server 100. Users may identify content uploaded by themselves or other users by selecting a toggle, such as "recommend" or "like", write a comment connected to the content, or share the content by using their accounts.

The content sharing system according to an example embodiment may provide a service enabling users to build a relationship and provide a social network service (SNS) based on the relationship between the users. For example, the users may assign each other as friends, and the content sharing system may provide content uploaded by the user to other users assigned as friends. Alternatively, a certain user may subscribe to channels including content of other users, and the content sharing system may gather the content of the other users in one page and provide the page to the certain user as a news feed screen. Here, a news feed screen is a screen in which news of other users of whom a certain user is a subscriber and/or news of other users assigned as friends by the certain user are listed.

The content sharing system according to an example embodiment may provide a home screen in which content uploaded by one user is gathered and provided as one page, or may provide a news feed screen in which content uploaded by several users is gathered and provided as one page. Alternatively, an end page of one piece of content may be provided. Also, the content sharing system may provide a content search service in which content corresponding to a certain search word is gathered and provided as one page.

Content uploaded by a user, according to an example embodiment, denotes various types of information or content provided through the Internet or computer communication, and may include an image, audio, a video, text, etc. Content according to an example embodiment may include an image/sound source, such as an image, audio, a video, or the like, and text input by a user as a description about the image/sound source, but the content is not limited thereto.

The server 100 may provide the content sharing service described above to the user terminal 200. The server 100 may process a request from the user terminal 200, manage content, and manage user account information while communicating with the user terminal 200. For example, when a content registration request is received from the user terminal 200, the server 100 may register content, and update an index of each of a plurality of users in order to provide a news feed to each of the plurality of users based on the registered content. Here, the server 100 does not need to update indexes of all users subscribed to the content sharing service, but may update indexes of users pre-set or, alternatively, set to subscribe to a channel of a user who registered content and an index of the user who registered the content. Here, in order to prevent too much overload generated when a high number of users is to be updated as a large amount of content is registered at once or when a high number of indexes of users needs to be updated due to a large number of subscribers despite of a small amount of registered content, the server 100 may perform a process of generating an index update command and a process of processing an index update command at different points of time or by using physically different system resources.

The user terminal 200 denotes a communication terminal capable of using a web service in a wired/wireless communication environment. Here, the user terminal 200 may be a personal computer (PC) 201 of a user or a mobile terminal 202 of the user. In FIG. 1, the mobile terminal 202 is illustrated as a smart phone, but an example embodiment is not limited thereto. For example, any mobile device upon which an application capable of web browsing is installed may be an example of the mobile terminal 202.

Meanwhile, the user terminal 200 includes a display displaying a screen and an input device receiving data from a user. For example, the input device may include a keyboard, a mouse, a track ball, a microphone, a button, or a touch panel, but is not limited thereto.

The network 300 connects the user terminal 200 and the server 100 to each other. For example, the network 300 provides an access path such that the user terminal 200 accesses the server 100 and transmits and receives packet data to and from the server 100.

Although not shown in FIG. 1, the server 100 according to an example embodiment may include a memory, an input/output (I/O) unit, a program storage unit, a controller, etc.

Figure 2:
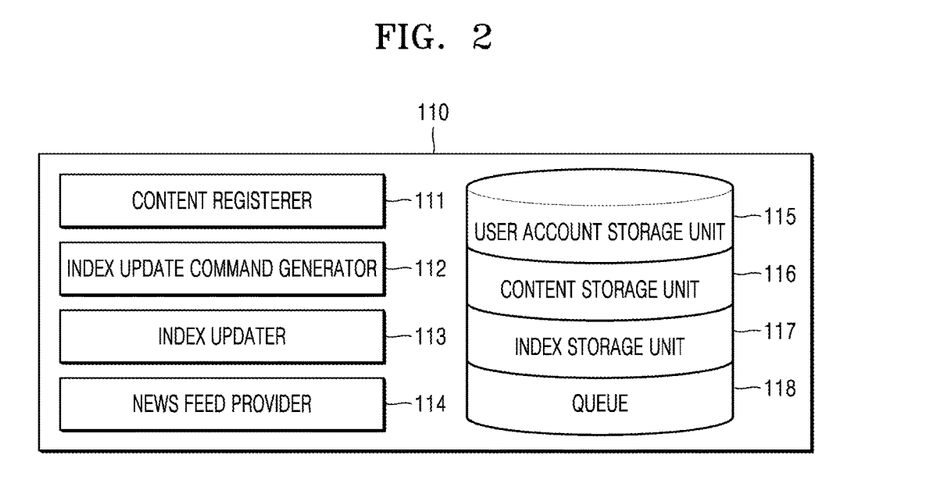
FIG. 2 is a block diagram of a structure of an apparatus for providing a content sharing service, according to an example embodiment.

FIG. 2 is a block diagram of a structure of an apparatus 110 for providing a content sharing service, according to an example embodiment.

The apparatus 110 according to an example embodiment may correspond to any type of apparatus capable of processing data, such as a processor. For example, the apparatus 110 may be at least one processor or may include at least one processor. Here, a processor may be a data processing apparatus included in hardware, the data processing apparatus having a physically structured circuit to perform a function expressed as a code or command included in a program. Examples of such a data processing apparatus include a microprocessor, a central processing unit (CPU), a processor core, a multiprocessor, an application-specific integrated circuit (ASIC), and a field programmable gate array (FPGA), but are not limited thereto. Accordingly, the apparatus 110 may be driven while being included in another hardware apparatus, such as a microprocessor or a general-use computer system. For example, the apparatus 110 may be mounted on, included in and/or embodied as the server 100 of FIG. 1.

In FIG. 2, some example components of the apparatus 110 are shown. However, the apparatus 110 may further include other components including, for example, general-purpose components.

For example, the apparatus 110 may further include a communicator including hardware and software capable of transmitting signals to, and receiving signals from, another network apparatus via a wired/wireless connection. The signals may include, for example, control signals and/or data signals.

Also, the apparatus 110 may further include a memory temporarily or permanently storing data processed by the apparatus 110. The memory may include a magnetic storage medium or a flash storage medium, but is not limited thereto.

The apparatus 110 may provide a content sharing service according to an example embodiment. For example, the apparatus 110 receives and registers content from a user, and provides the registered content to other users. The registered content may be provided to other users pre-set or, alternatively, set to subscribe to a channel of the user who registered the content. A point of time when the registered content is provided to the other users may be a point of time when each of the other users requests a news feed screen in which news of users of whom each of the other users is a subscriber is gathered. However, if a user is set to receive a notification of new news when his/her index is updated, a point of time when registered content is provided may be a point of time when the user's index is updated.

Referring to FIG. 2, the apparatus 110 according to an example embodiment includes a content registerer 111, an index update command generator 112, an index updater 113, and a news feed provider 114.

According to at least some example embodiments, the components of the apparatus 110 are all embodied on one processor and may be distinguished according to functions, but are not limited to such an arrangement. For example, according to at least some example embodiments, some or all of the components of the apparatus 110 illustrated in FIG. 2 may be embodied on individual processors, respectively. Also, functions of each component may be integrally embodied through one program code executed by one or more processors, but alternatively, may be embodied by individual program codes executed by one or more processors such that the program codes interwork with each other to provide the content sharing service provided by the apparatus 110.

The apparatus 110 further includes a user account storage unit 115, a content storage unit 116, an index storage unit 117, and a queue 118. The user account storage unit 115, the content storage unit 116, the index storage unit 117, and the queue 118 may be configured as one storage apparatus or as a plurality of separate storage apparatuses, wherein the storage apparatus(es) may be embodied by, for example, tangible non-transitory computer-readable storage media, such as random access memory (RAM), read only memory (ROM), a nonvolatile mass storage device (such as a disk drive or solid state drive), and/or any other like data storage mechanism capable of storing and recording data. In FIG. 2, the user account storage unit 115, the content storage unit 116, the index storage unit 117, and the queue 118 are included in the apparatus 110, but an example embodiment is not limited thereto. For example, the user account storage unit 115, the content storage unit 116, the index storage unit 117, and the queue 118 may be separated from the server 100 and may communicate by wire or wirelessly with the apparatus 110.

The user account storage unit 115 stores account information of all users subscribed to a content sharing service according to an example embodiment. The user account storage unit 115 stores a friend relationship between users, an account list of other users of whom each user is a subscriber, and an account list of subscribers of each user.

The content storage unit 116 stores content registered by a user. When a content lookup request is received from the user, the content stored in the content storage unit 116 is read and provided to the user. The content storage unit 116 stores content details, content identification (ID) numbers, and content preparer information. The content storage unit 116 matches and stores content and ID information in a one-to-one manner. In other words, the content storage unit 116 stores a plurality of pieces of content and a plurality of pieces of ID information respectively matching the plurality of pieces of content.

The index storage unit 117 stores an index for configuring a news feed screen to be provided to each user. The index storage unit 117 stores an index for news feeds according to users. ID information about news of other users of whom a user is a subscriber is listed in an index of the user in a time order in which the news is registered. Here, news of a user includes content registered by the user, an activity history of the user in a content sharing service, etc. For example, ID information of content uploaded by other users of whom each user is a subscriber may be listed in an index of each user in a time order in which the content is registered. A time when content is registered may be a time when the content is stored in the content storage unit 116. Meanwhile, the index of each user may further include ID information about his/her own news.

When a news feed provision request is received from a user, content corresponding to ID information included in an index of the user is read (e.g., by the apparatus 110) from the content storage unit 116 by referring to the index stored in the index storage unit 117, and a news feed screen including the first content may be provided to the user who transmitted the news feed provision request.

The queue 118 may store an index update command to be processed by the index updater 113. The queue 118 may be an array memory storing a plurality of commands in an order in which the plurality of commands are input. The index update command generator 112 may generate an index update command and store the index update command in the queue 118, and the index updater 113 may read and process index update commands in an order in which the index update commands are stored in the queue 118.

Hereinafter, an example embodiment is discussed in which, in order to provide content registered by a user to other users, indexes of the other users are updated and a news feed screen is provided to the other users based on the updated indexes. Here, for convenience of description, a user who registers content is referred to as a first user and a user who requests a news feed is referred to as a second user. The terms "first" and "second" are used only to distinguish, in the manner discussed above, users to be described and are not used to limit the users. For example, the first and second users may be the same user or may be different users.

The content registerer 111 according to an example embodiment receives a content registration request from a first user. The content registration request includes content, and the content may include at least one of text, an image, a sound source, and location information.

The content registerer 111 generates ID information of content received from the first user, matches the content and the ID information, and stores the content and the ID information in the content storage unit 116. The content registerer 111 transmits ID information of the first user and the ID information of the content to the index update command generator 112.

The index update command generator 112 according to an example embodiment generates an index update command for updating an index of each of other users having a pre-set or, alternatively, desired relationship with the first user, by using the ID information of the first user and the ID information of the content. According to at least some example embodiments, an example of a pre-set or, alternatively, desired relationship may be a subscriber relationship in which one user is a subscriber of another user. According to another example, the other users having the first relationship with the first user are users subscribed to a channel including content uploaded by the first user.

According to an example embodiment, the index update command generator 112 obtains, from the user account storage unit 115, a list of ID information of the other users having the pre-set or, alternatively, desired relationship with the first user, by using the ID information of the first user. For example, the other users having the pre-set or, alternatively, desired relationship with the first user may be defined as subscribers who are subscribed to a channel of the first user.

Then, the index update command generator 112 generates the index update command including the ID information of the subscribers of the first user obtained from the user account storage unit 115, and the ID information of the content registered by the first user. The index update command may be a command for adding the ID information of the content registered by the first user to the index of each subscriber of the first user, the index being stored in the index storage unit 117. The index update command may further include the ID information of the first user. In other words, the index update command may be a command for adding the ID information of the content registered by the first user not only to the indexes of the subscribers of the first user but also to the index of the first user.

According to an example embodiment, the index update command generator 112 may generate at least two index update commands according to the number of subscribers of the first user. For example, when the number of subscribers of the first user is higher than a pre-set or, alternatively, desired number of subscribers, at least two index update commands may be generated. Each index update command may be a command for adding the ID information of the content registered by the first user to indexes of subscribers whose number does not exceed the pre-set or, alternatively, desired number of subscribers.

For example, when the number of subscribers of the first user is 1,000 and the pre-set or, alternatively, desired number of subscribers is 400, the index update command generator 112 may generate a total of three index update commands, i.e., a first index update command for adding the ID information of the content registered by the first user to indexes of a total of 400 subscribers from first through 400th subscribers, a second index update command for adding the ID information of the content registered by the first user to indexes of a total of 400 subscribers from 401st through 800th subscribers, and a third index update command for adding the ID information of the content registered by the first user to indexes of a total of 200 subscribers from 801st through 1,000th subscribers. The index update command generator 112 may sequentially store the three index update commands in the queue 118.

According to another embodiment, the index update command generator 112 may generate only the second index update command for adding the ID information of the content registered by the first user without considering the number of subscribers subscribed to the channel of the first user. In this case, the index updater 113 may split the second index update command into a plurality of update commands considering the number of subscribers at a point of time when an update command is processed. For example, the index updater 113 may perform, at once, processes of updating the number of indexes equal to the total number of subscribers, wherein the processes are included in the second index update command, or may perform, a plurality of times, a process of updating the number of indexes equal to the number of certain unit subscribers correspondingly to the second index update command. In other words, when the number of subscribers subscribed to the channel of the first user is 1,000 and the certain unit subscribers are 400, the index updater 113 may perform a process of updating indexes of 1,000 subscribers or may sequentially perform a process of updating indexes of first through 400th subscribers, a process of updating indexes of 401st through 800th subscribers, and a process of updating indexes of 801st through 1,000th subscribers. According to another embodiment, in order to update indexes a plurality of times, the index updater 113 may store a plurality of index update commands generated correspondingly to the second index update command in a queue, and sequentially process the plurality of index update commands stored in the queue.

As such, by limiting the number of indexes updated by one index update command, a processor processing one index update command may be prevented from being overloaded. Also, when there are a plurality of processors that process the index update commands stored in the queue 118, the plurality of processors may dividedly perform processes of updating the indexes of the subscribers of the first user and thus the processes of updating the indexes according to the registration of the content of the first user may quickly end.

The index updater 113 according to an example embodiment updates the index of each subscriber of the first user based on the index update command. For example, the index updater 113 adds the ID information of the content included in the index update command to the index of each subscriber of the first user. However, an example embodiment is not limited thereto. The index updater 113 may read the index update commands stored in the queue 118 one by one, and updates the index of each subscriber of the first user based on the index update command. For example, the index updater 113 adds the ID information of the content included in the index update command to the index of each subscriber of the first user. The index updater 113 reads and processes the index update commands in an order in which the index update commands are stored in the queue 118. In other words, the index updater 113 first processes the index update command that is first stored in the queue 118.

When the index update command includes the ID information of each subscriber of the first user and the ID information of the content registered by the first user, according to an example embodiment, the index updater 113 adds the ID information of the content registered by the first user to the index of each subscriber of the first user, the index being stored in the index storage unit 117. While adding ID information of certain content to a certain index, the index updater 113 may add the ID information of the certain content to a first storage space. An index may sequentially store ID information of a plurality of pieces of content, and ID information of content, which is newly added, may be stored in the first storage space of the index. According to such a storage method, ID information of a plurality of pieces of content are listed and stored in the index in an order in which the plurality of pieces of content are added, wherein ID information of content, which is stored more recently is stored in the first storage space of the index. However, an example embodiment is not limited thereto, and ID information of content, which is stored more recently may be stored in a later row.

Meanwhile, the index updater 113 may also update the index of the first user who registered the content. A news feed of each user may display not only content of another user's news feed to which each user subscribed, but also content from among his/her own content. For example, the index updater 113 may add the ID information of the content registered by the first user to the index of the first user, the index stored in the index storage unit 117, by referring to the index update command.

The index updater 113 may include a plurality of processors, and each of the plurality of processors may read the index update commands stored in the queue 118 one by one and asynchronously process the read index update commands. Each of the plurality of processors may read and process a subsequent index update command when the processing of one index update command read from the queue 118 is ended, or may independently process an index update command.

The news feed provider 114 according to an example embodiment receives the news feed provision request from the second user, and provides a news feed to the second user based on an index of the second user, the index being stored in the index storage unit 117. For example, the news feed provider 114 may read, from the content storage unit 116, content matching ID information of content included in the index of the second user, and provide a news feed including the first content to the second user.

As described above, when the index of the second user stores ID information of content that is recently stored in a front row, the news feed provider 114 lists and provides a plurality of pieces of content in the same order in which the ID information of the plurality of pieces of content are stored in the index of the second user while listing and providing the plurality of contents in the news feed.

However, according to another embodiment, when the index of the second user stores ID information of content that is recently stored in a rear row, the news feed provider 114 lists and provides a plurality of pieces of content in a reverse order in which the ID information of the plurality of pieces of content are stored in the index of the second user.

The news feed provider 114 selects the number of pieces of ID information of content, which does not exceed a pre-set or, alternatively, desired number from among a plurality of pieces of ID information of content included in the index of the second user, reads content corresponding to the selected pieces of ID information from the content storage unit 116, and provides a news feed including the first content to the second user. An order in which the first content is listed in the news feed may correspond to an order in which the ID information of the content is listed in the index.

Here, when the news feed provider 114 selects the number of pieces of ID information of content, which does not exceed the pre-set or, alternatively, desired number, the news feed provider 114 may select the number of pieces of ID information of content from a first portion of the index. Accordingly, the news feed including the number of pieces of content corresponding to the ID information of the content may be provided, wherein the content is content most recently added to the index of the second user and the number of pieces of which does not exceed the pre-set or, alternatively, desired number. For example, when a total of 50 pieces of ID information of content are listed in the index of the second user and the pre-set or, alternatively, desired number is 20, the news feed provider 114 provides a news feed including pieces of content corresponding to 20 pieces of ID information of the content from the first 20 of the 50 pieces of ID information stored in the index of the second user. According to another embodiment, when the index of the second user stores recent ID information of content in a later row, the news feed provider 114 may select the number of pieces of ID information of content, the number not exceeding the pre-set or, alternatively, desired number, from the last row of the index of the second user.

As such, even when a news feed is limitedly provided, when the second user requests additional content, the news feed provider 114 may further include, in the news feed, a pre-set or, alternatively, desired number of pieces of content corresponding to ID information of content. For example, if the index of the second user stores a total of 50 pieces of ID information of content and a news feed including content corresponding to 20 pieces of the ID information from the first 20 of the 50 pieces of ID information is first provided since the pre-set or, alternatively, desired number is 20, when the second user requests additional content, the news feed provider 114 may read, from the content storage unit 116, and further include, in the news feed, content corresponding to 21st through 40th ID information of content. In this case, the news feed includes a total of 40 pieces of content.

According to the embodiments described above, processing of content is limited only to when initial content is registered and content is read to provide a news feed. While processing an index, or the like, only ID information of content is used.

According to one or more embodiments, even when the number of users of a content sharing service increases and a relationship between the users becomes complex, a data throughput required to process an index is reduced, and thus the index may be quickly processed.

Figure 3:
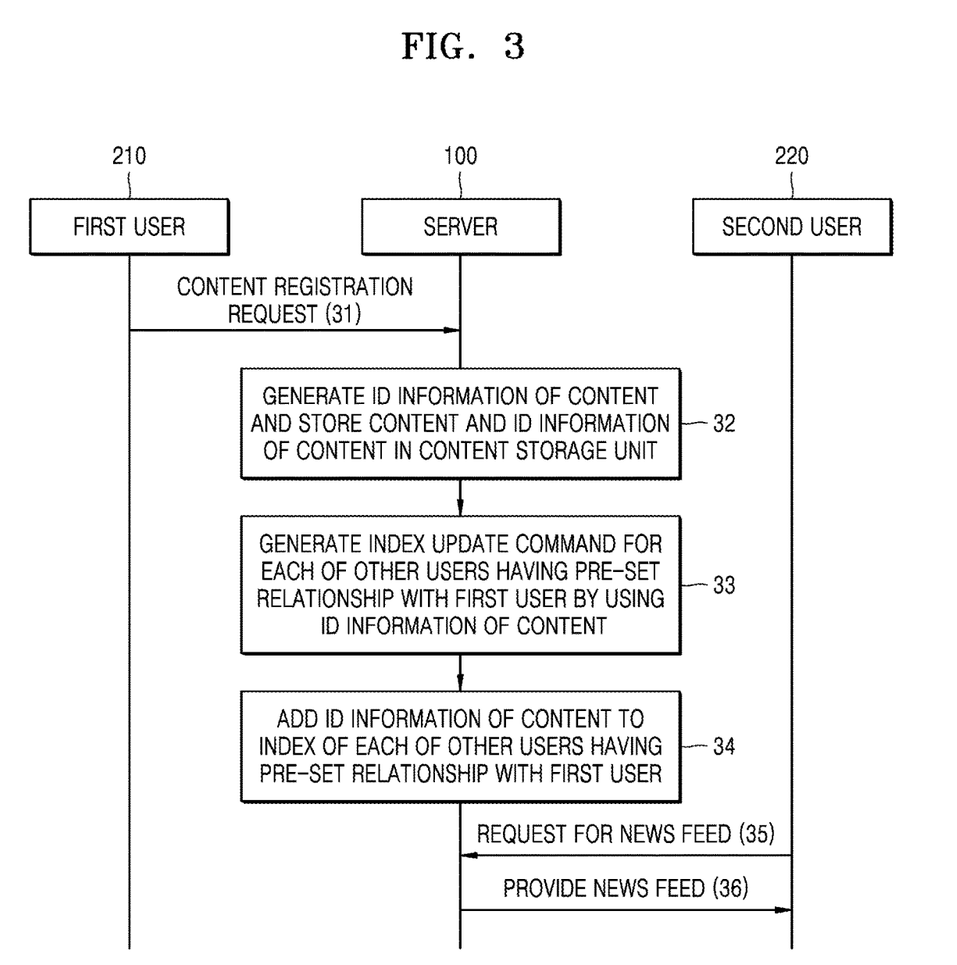
FIG. 3 is a flowchart of a method of providing a content sharing service, according to an example embodiment.

FIG. 3 is a flowchart of a method of providing a content sharing service, according to an example embodiment.

The method of FIG. 3 includes operations that are performed in time-series by a first user 210, the server 100, and a second user 220. Here, the server 100 includes the apparatus 110 of FIG. 2. Thus, even if omitted, details described above with reference to FIG. 2 may also be applied to the method of FIG. 3.

Referring to FIG. 3, the first user 210 transmits a content registration request to the server 100 in operation 31. The content registration request includes content.

In operation 32, the server 100, for example, the content registerer 111 of FIG. 2, generates ID information of the content received in operation 31, and stores the content and the ID information of the content in the content storage unit 116.

In operation 33, the server 100, for example, the index update command generator 112 of FIG. 2, generates an index update command for updating an index of each of other users having a pre-set or, alternatively, desired relationship with the first user 210, by using the ID information of content generated in operation 32.

In operation 34, the server 100, for example, the index updater 113 of FIG. 2, adds the ID information of the content generated in operation 32 to an index of each of the other users according to the index update command generated in operation 33. The indexes of the other users are stored in the index storage unit 117, and in operation 34, the index updater 113 updates the indexes stored in the index storage unit 117.

In operation 35, the second user 220 requests for a news feed.

In operation 36, the server 100, for example, the news feed provider 114 of FIG. 2, provides the news feed to the second user 220 by referring to an index of the second user stored in the index storage unit 117.

Figure 4:
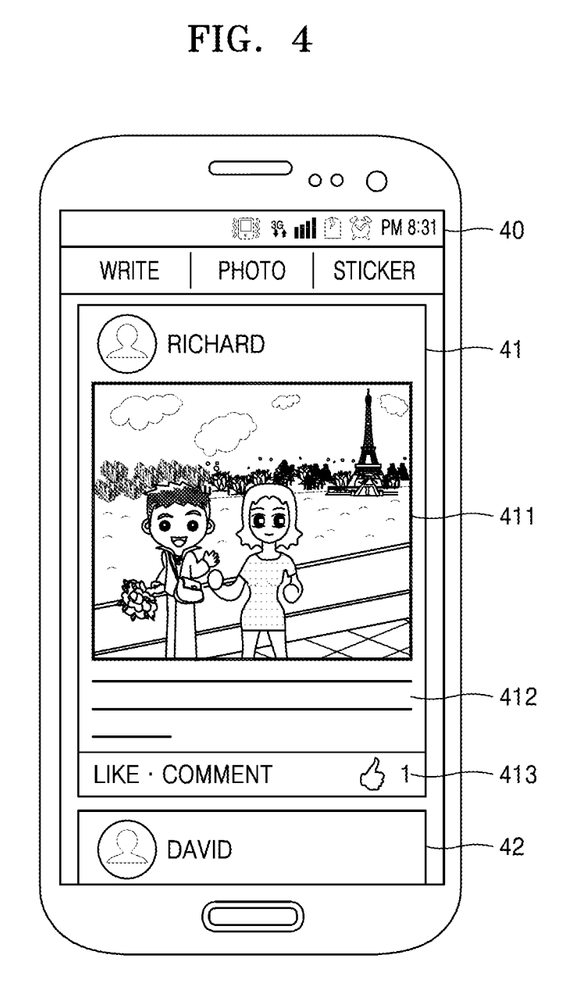
FIG. 4 illustrates an example of a news feed screen provided by a news feed provider, according to an example embodiment.

FIG. 4 illustrates an example of a news feed screen provided by the news feed provider 114, according to an example embodiment.

A screen 40 of FIG. 4 is an example of a news feed screen of a second user, and shows a list of other users news feeds to which the second user subscribed. For example, in FIG. 4, the screen 40 provided to the second user shows content 41 of Richard who is a user of whom the second user is a subscriber, and content 42 of David who is another user of whom the second user is a subscriber.

Referring to FIG. 4, the content 41 may include an image 411 and text 412. Users may identify with the content 41 or write a comment about the content 41, wherein information about such identification or comment is shown at a bottom 413 of the content 41.

The index of the second user, which is stored in the index storage unit 117 may first store ID information of the content 41 and then store ID information of the content 42.

Also, the content storage unit 116 may store the ID information of the content 41 and the content 41, and the ID information of the content 42 and the content 42.

The news feed provider 114 may refer to ID information of content included in the index of the second user, the index stored in the index storage unit 117, to read, from the content storage unit 116, content matching the ID information of content, and provide the screen 40 by listing the read content in the same order in which the ID information of content is listed in the index of the second user.

As such, an index does not store actual content, but only stores ID information of content. Thus, the news feed provider 114 refers to both the index storage unit 117 and the content storage unit 115 to configure a news feed screen.

A method, apparatus, and computer-readable recording medium for providing a content sharing service, according to one or more embodiments, generate an index for a news feed by using ID information of content, and thus a data throughput required to generate the index is remarkably reduced.

A method, apparatus, and computer-readable recording medium for providing a content sharing service, according to one or more embodiments, uniformly manage content by using the content storage unit 116, and thus a possibility that details of content are modified is reduced while the content is transmitted to subscribers.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, FPGAs, or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. A method of providing a content sharing service, the method comprising:
   receiving, from a first user, a content registration request including first content;
   in response to receiving the content registration request, generating identification (ID) information of the first content,
      storing the first content and the ID information of the first content in a content storage unit,
      generating a first index update command for updating an index of each of other users having a first relationship with the first user by using the ID information of the first content, and
      enqueueing the first index update command in a queue that includes one or more preceding index update commands,
   the generating of the first index update command including,
      obtaining a list of ID information of the other users having the first relationship with the first user from a user account storage unit based on ID information of the first user, and
      generating the first index update command such that the first index update command includes the ID information of the other users and the ID information of the first content;
   sequentially reading the one or more preceding index update commands and the first index update command;
   processing the one or more preceding index update commands and the first index update command,
   the processing of the first index update command including adding the ID information of the first content to the indices of each of the other users, based on the first index update command, each of the indices of the other users being stored in an index storage unit, the other users including a second user;
   receiving a news feed provision request from the second user;
   reading content stored in the content storage unit based on ID information of content included in an index of the second user, the read content including the first content, the ID information of the content included in an index of the second user including the ID information of the first content; and
   providing a news feed including the first content to the second user.

2. The method of claim 1,
   wherein the enqueueing of the first index update command comprises:

in response to a number of the other users having the first relationship with the first user being higher than a pre-set number of unit subscribers, splitting the first index update command into a plurality of index update commands and storing the plurality of index update commands in the queue, and wherein the processing of the first index update command further includes:

in response to the number of the other users having the first relationship with the first user being higher than the pre-set number of unit subscribers, and the first index update command being split into the plurality of index update commands, adding the ID information of the content to the index of each of the other users stored in the index storage unit, according to the plurality of index update commands stored in the queue.

3. The method of claim 1, wherein the first index update command further includes the ID information of the first user.

4. The method of claim 1, further comprising:
adding the ID information of the first content to an index of the first user after the generating ID information of the first content and the storing the first content and the ID information of the first content,
the index of the first user being stored in the index storage unit.

5. The method of claim 1, wherein the other users having the first relationship with the first user are users subscribed to a channel including content uploaded by the first user.

6. The method of claim 1, further comprising:
matching a plurality of pieces of content and a plurality of pieces of ID information in a one-to-one manner; and
storing the matched plurality of pieces of content and plurality of pieces of ID information in the content storage unit in the one-to-one manner.

7. The method of claim 1 further comprising:
storing indices of each of users subscribed to the content sharing service, respectively, in the index storage unit,
ID information of content registered by other users being listed in the indices of users from among the users subscribed to the content sharing service.

8. The method of claim 7, wherein for a first index stored in the index storage unit, ID information stored in the first index is listed in an order corresponding to an order in which content which the ID information stored in the first index identifies was registered.

9. The method of claim 1, wherein the news feed is a screen in which first content is listed in an order, with respect to other content, that corresponds to an order, with respect to ID information of the other content, in which the ID information of the first content is stored in the index of the second user.

10. A non-transitory computer-readable recording medium storing computer-executable instructions that, when executed by a processor, cause the processor to perform operations including:
receiving, from a first user, a content registration request including first content;
in response to receiving the content registration request,
generating identification (ID) information of the first content,
storing the first content and the ID information of the first content in a content storage unit,
generating a first index update command for updating an index of each of other users having a first relationship with the first user by using the ID information of the first content, and
enqueueing the first index update command in a queue that includes one or more preceding index update commands,
the generating of the first index update command including,
obtaining a list of ID information of the other users having the first relationship with the first user from a user account storage unit based on ID information of the first user, and
generating the first index update command such that the first index update command includes the ID information of the other users and the ID information of the first content;
sequentially reading the one or more preceding index update commands and the first index update command;
processing the one or more preceding index update commands and the first index update command,
the processing of the first index update command including adding the ID information of the first content to the indices of each of the other users, based on the first index update command, each of the indices of the other users being stored in an index storage unit, the other users including a second user;
receiving a news feed provision request from the second user;
reading content stored in the content storage unit based on ID information of content included in an index of the second user, the read content including the first content, the ID information of the content included in an index of the second user including the ID information of the first content; and
providing a news feed including the first content to the second user.

11. An apparatus for providing a content sharing service, the apparatus comprising:
memory storing computer-executable instructions; and
one or more processors configured to execute the instructions such that the one or more processors are configured to,
receive, from a first user, a content registration request including first content,
in response to receiving the content registration request,
generate identification (ID) information of the first content,
store the first content and the ID information of the first content in a content storage unit,
generate a first index update command for updating an index of each of other users having a first relationship with the first user by using the ID information of the first content, and
enqueue the first index update command in a queue that includes one or more preceding index update commands,
the generating of the first index update command including,
obtaining a list of ID information of the other users having the first relationship with the first user from a user account storage unit based on ID information of the first user, and
generating the first index update command such that the first index update command includes the ID information of the other users and the ID information of the first content,
sequentially read the one or more preceding index update commands and the first index update command, process the one or more preceding index update commands and the first index update command, the processing of the first index update command including adding the ID information of the first content to the indices of each of the other users, based on the first index update command, each of the indices of the other users being stored in an index storage unit, the other users including a second user, receive a news feed provision request from the second user, read content stored in the content storage unit based on ID information of content included in an index of the second user, the read content including the first content, the ID information of the content included in an index of the second user including the ID information of the first content, and provide a news feed including the first content to the second user.

* * * * *